US012694672B2

(12) United States Patent
Ding et al.

(10) Patent No.:  US 12,694,672 B2
(45) Date of Patent:       Jul. 28, 2026

(54) NEURAL NETWORKS IMPLEMENTING ATTENTION OVER OBJECT EMBEDDINGS FOR OBJECT-CENTRIC VISUAL REASONING

(71) Applicant: GDM Holding LLC, Mountain View, CA (US)

(72) Inventors: Fengning Ding, London (GB); Adam Anthony Santoro, London (GB); Felix George Hill, London (GB); Matthew Botvinick, Philadelphia, PA (US); Luis Piloto, London (GB)

(73) Assignee: GDM Holding LLC, Mountain View, CA (US)

( * ) Notice: Subject to any disclaimer, the term of this patent is extended or adjusted under 35 U.S.C. 154(b) by 440 days.

(21) Appl. No.: 18/029,980

(22) PCT Filed: Oct. 1, 2021

(86) PCT No.: PCT/EP2021/077168
§ 371 (c)(1),
(2) Date: Apr. 3, 2023

(87) PCT Pub. No.: WO2022/069735
PCT Pub. Date: Apr. 7, 2022

(65) Prior Publication Data
US 2024/0020972 A1      Jan. 18, 2024

Related U.S. Application Data

(60) Provisional application No. 63/087,041, filed on Oct. 2, 2020.

(51) Int. Cl.
*G06V 20/40*          (2022.01)
*G06V 10/26*          (2022.01)
(Continued)

(52) U.S. Cl.
CPC ............. *G06V 20/41* (2022.01); *G06V 10/26* (2022.01); *G06V 10/776* (2022.01); *G06V 10/82* (2022.01)

(58) Field of Classification Search
CPC ........ G06V 20/41; G06V 10/82; G06V 10/26; G06V 10/776
See application file for complete search history.

(56) References Cited

U.S. PATENT DOCUMENTS

| | | | |
|---|---|---|---|
| 2017/0185846 A1 * | 6/2017 | Hwangbo | .............. G06V 20/49 |
| 2019/0354567 A1 | 11/2019 | Dehghani et al. | |

(Continued)

FOREIGN PATENT DOCUMENTS

| | | |
|---|---|---|
| CN | 108733792 A | 11/2018 |
| WO | WO 2020/104499 | 5/2020 |

OTHER PUBLICATIONS

Battaglia et al., "Relational inductive biases, deep learning, and graph networks," CoRR, Jun. 4, 2018, arxiv.org/abs/1806.01261, 40 pages.

(Continued)

*Primary Examiner* — Syed Haider
(74) *Attorney, Agent, or Firm* — Fish & Richardson P.C.

(57) ABSTRACT

A video processing system configured to analyze a sequence of video frames to detect objects in the video frames and provide information relating to the detected objects in response to a query. The query may comprise, for example, a request for a prediction of a future event, or of the location of an object, or a request for a prediction of what would happen if an object were modified. The system uses a transformer neural network subsystem to process representations of objects in the video.

20 Claims, 4 Drawing Sheets

(51) Int. Cl.
    *G06V 10/776*     (2022.01)
    *G06V 10/82*      (2022.01)

(56)            References Cited

U.S. PATENT DOCUMENTS

| | | | |
|---|---|---|---|
| 2020/0034627 A1* | 1/2020 | Zhu | G06N 3/0442 |
| 2021/0103733 A1* | 4/2021 | Jiang | G06V 20/46 |
| 2021/0248376 A1* | 8/2021 | Zhao | G06V 20/49 |
| 2021/0321172 A1* | 10/2021 | Krishnamurthy | G06N 3/04 |
| 2021/0390316 A1* | 12/2021 | Schoneveld | G06N 3/0895 |
| 2023/0178199 A1* | 6/2023 | Soltani Bidgoli | G16H 50/20 |
| | | | 705/3 |

OTHER PUBLICATIONS

Brown et al., "Language models are few-shot learners," CoRR, May 28, 2020, arXiv:2005.14165, 75 pages.

Burgess et al., "MONet: Unsupervised scene decomposition and representation," CoRR, Jan. 22, 2019, arXiv:1901.11390, 22 pages.

Carion et al., "End-to-End Object Detection with Transformers," CoRR, May 26, 2020, arxiv.org/abs/2005.12872, 26 pages.

Carreira et al., "Quo vadis, action recognition? A new model and the kinetics dataset," CoRR, May 22, 2017, arxiv.org/abs/1705.07750, 10 pages.

Chen et al., "A simple framework for contrastive learning of visual representations," CoRR, Feb. 13, 2020, arXiv:2002.05709, 20 pages.

Chen, "Object-based attention: A tutorial review," Attention, Perception, & Psychophysics, Jun. 7, 2012, 74:784-802.

Dai et al., "Transformer-XL: Attentive language models beyond a fixed-length context," CoRR, Jan. 9, 2019, arXiv:1901.02860, 20 pages.

Desta et al., "Object-based reasoning in VQA," CoRR, Jan. 29, 2018, arxiv.org/abs/1801.09718, 10 pages.

Devlin et al., "BERT: Pre-training of deep bidirectional transformers for language understanding," CoRR, Oct. 11, 2018, arXiv:1810.04805, 16 pages.

Du et al., "Unsupervised discovery of 3D physical objects from video," CoRR, Jul. 24, 2020, arXiv:2007.12348, 15 pages.

Girdhar et al., "CATER: A diagnostic dataset for Compositional Actions and TEmporal Reasoning," International Conference on Learning Representations, Dec. 19, 2019, 16 pages.

Greff et al., "Multi-object representation learning with iterative variational inference," CoRR, Mar. 1, 2019, arxiv.org/abs/1903.00450, 28 pages.

Gregor et al., "Shaping belief states with generative environment models for RL," Advances in Neural Information Processing Systems 32, 2019, 13 pages.

Hahn et al., "Transformers generalize to the semantics of logics," CoRR, 2020, arXiv:2003.04218, 15 pages.

Han et al., "Video representation learning by dense predictive coding," Proceedings of the IEEE/CVF International Conference on Computer Vision (ICCV), 2019, 10 pages.

He et al., "Deep residual learning for image recognition," CoRR, Dec. 10, 2015, arxiv.org/abs/1512.03385, 12 pages.

He et al., "Mask R-CNN," CoRR, Mar. 20, 2017, arxiv.org/abs/1703.06870, 12 pages.

Hill et al., "Human instruction-following with deep reinforcement learning via transfer-learning from text," CoRR, May 19, 2020, arXiv:2005.09382, 19 pages.

Hudson et al., "Compositional attention networks for machine reasoning," CoRR, Mar. 8, 2018, arxiv.org/abs/1803.03067, 20 pages.

International Search Report and Written Opinion in International Appln. No. PCT/EP2021/077168, dated Jan. 5, 2022, 16 pages.

Johnson et al., "CLEVR: A diagnostic dataset for compositional language and elementary visual reasoning," CoRR, Dec. 20, 2016, arxiv.org/abs/1612.06890, 17 pages.

Kingma et al., "Adam: A method for stochastic optimization," CoRR, Dec. 22, 2014, arXiv:1412.6980, 15 pages.

Lample et al., "Deep learning for symbolic mathematics," International Conference on Learning Representations, Dec. 19, 2020, 24 pages.

Li et al., "Visualbert: A simple and performant baseline for vision and language," CoRR, Aug. 9, 2019, arXiv:1908.03557, 14 pages.

Lin et al., "SPACE: Unsupervised object-oriented scene representation via spatial attention and decomposition," International Conference on Learning Representations, Dec. 19, 2019, 22 pages.

Lu, "Vilbert: Pretraining task-agnostic visiolinguistic representations for vision-and-language tasks," CoRR, Aug. 6, 2019, arXiv:1908.02265, 11 pages.

Medium.com [online], "Can GPT-3 Make Analogies?," Aug. 5, 2020, retrieved on May 3, 2024, retrieved from URL<https://medium.com/@melaniemitchell.me/can-gpt-3-make-analogies-16436605c446/>, 26 pages.

Raposo et al., "Discovering objects and their relations from entangled scene representations," CoRR, Feb. 16, 2017, arxiv.org/abs/1702.05068, 16 pages.

Ren et al., "Faster R-CNN: towards real-time object detection with region proposal networks," CoRR, Jun. 4, 2015, arxiv.org/abs/1506.01497, 14 pages.

Roelfsema et al., "Object-based attention in the primary visual cortex of the macaque monkey," Nature, 1998, 395:376-381.

Sadhu et al., "Video Object Grounding Using Semantic Roles in Language Description," 2020 IEEE/CVF Conferences on Computer Vision and Pattern Recognition (CVPR), Jun. 13, 11 pages.

Spelke, "Core knowledge," The American Psychologist, 2000, 55:1233-43.

Steenkiste et al., "A perspective on objects and systematic generalization in model-based RL," CoRR, Jun. 3, 2019, arxiv.org/abs/1906.01035, 6 pages.

Su et al., "Vl-bert: Pre-training of generic visual-linguistic representations," International Conference on Learning Representations, Dec. 19, 2019, 16 pages.

Sun et al., "Contrastive bidirectional transformer for temporal representation learning," CoRR, Jun. 13, 2019, arxiv.org/abs/1906.05743, 12 pages.

Sun et al., "VideoBERT: A joint model for video and language representation learning," CoRR, Apr. 3, 2019, arxiv.org/abs/1904.01766, 13 pages.

Vaswani et al., "Attention is all you need," Advances in neural information processing systems 30, 2017, 11 pages.

Wang et al., "Non-local neural networks," Proceedings of the IEEE Conference on Computer Vision and Pattern Recognition, 2018, pp. 7794-7803.

Wu et al., "Analogical Reasoning for Visually Grounded Language Acquisition," CoRR, Jul. 22, 2020, arXiV:2007.11668v1, 12 pages.

Yi et al., "CLEVRER: Collision events for video representation and reasoning," International Conference on Learning Representations, Dec. 19, 2019, 19 pages.

You et al., "Large batch optimization for deep learning: Training BERT in 76 minutes," Technical Report UCB/EECS-2019-103, EECS Department, Jun. 21, 2019, 38 pages.

Zambaldi et al., "Deep reinforcement learning with relational inductive biases," International Conference on Learning Representations, Dec. 20, 2018, 18 pages.

Zhu et al., "An Empirical Study of Spatial Attention Mechanisms in Deep Networks," Proceedings of the IEEE/CVF International Conference on Computer Vision (ICCV), Oct. 27, 2019, pp. 6687-6696.

Office Action in Chinese Appln. No. 202180067194.5, mailed on Nov. 26, 2025, 22 pages (with English translation).

* cited by examiner

400

OBTAIN A TRAINING EXAMPLE AND PROCESS
TO GENERATE A RESPONSE

402

DETERMINE A CLASSIFICATION LOSS BASED
ON THE CORRECT RESPONSE

404

OPTIONALLY DETERMINE AN AUXILIARY,
INFILL LOSS

406

OPTIONALLY DETERMINE AN ADDITIONAL
AUXILIARY LOSS

408

BACKPROPAGATE GRADIENTS OF THE
LOSS(ES) TO TRAIN THE SYSTEM

NEURAL NETWORKS IMPLEMENTING ATTENTION OVER OBJECT EMBEDDINGS FOR OBJECT-CENTRIC VISUAL REASONING

CROSS-REFERENCE TO RELATED APPLICATIONS

This application is a National Stage Application under 35 U.S.C. § 371 and claims the benefit of International Application No. PCT/EP2021/077168, filed Oct. 1, 2021, which claims priority to U.S. Provisional Application No. 63/087,041, filed on Oct. 2, 2020. The disclosure of the prior application is considered part of and is incorporated by reference in the disclosure of this application.

BACKGROUND

This specification relates to systems that process a sequence of video frames to generate a response to a query.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a video processing neural network system implemented as one or more computer programs on one or more computers in one or more locations that is able to reason about objects in a sequence of video frames. More particularly the system is configured to process the video frames to respond to a query relating to the objects. As used herein "video frames" includes video frames from LIDAR and other radar-like technologies.

The subject matter described in this specification can be implemented in particular embodiments so as to realize one or more of the following advantages.

Implementations of the object-centric processing described in this specification can answer queries which require high-level spatio-temporal reasoning. The system can also provide a correct response to queries which require an understanding of the dynamics of interacting objects. Implementations of the system can answer queries which require predictive reasoning ("what will happen next"), counterfactual reasoning ("what would happen in a different circumstance"), explanatory reasoning ("why did something happen"), and causal reasoning generally. Implementations of the system can also demonstrate understanding of object permanence, e.g. when tracking a target which is temporarily occluded, and can reason about the causal, dynamic structure of visual data.

The described object-centric techniques can succeed where previous approaches have failed, or where a more hand-engineered, neuro-symbolic approach has previously been required.

Implementations of the system rely in part on unsupervised learning, in particular for the object segmentation subsystem. In general the system can learn faster and with relatively smaller amounts of labelled training data than some other approaches, thus reducing training time, and computation and memory requirements.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a video processing system that is configured to analyze a sequence of video frames to detect objects in the video frames and provide information relating to the detected objects in response to a query. The query may comprise, for example, a request for a prediction of a future event or state relating to one or more of the objects (e.g. "will objects X and Y collide?"), or a request for conditional or counterfactual information relating to one or more of the objects (e.g. "what event would [not] happen if object X is modified, moved or absent?"), or a request for analysis of the video frames to determine a property or characteristic of one or more of the objects (e.g. "how many objects of type Z are moving?").

The response to the query may, for example, be in the form of a yes/no answer, or may define a probability distribution over a set of possible answers; or the response may define the location of an object. Implementations of the system are flexible in the types of query that can be defined, and a single implementation of the system can handle multiple different types of query. Merely by way of example, the system can be used to predict whether or not two objects will collide, or how this may be avoided. The response to the query may be used by a human or computer system in many ways. For example the analysis may be useful in itself, or it may be used to provide a warning and/or to control motion of one or more of the objects.

Figure 1:
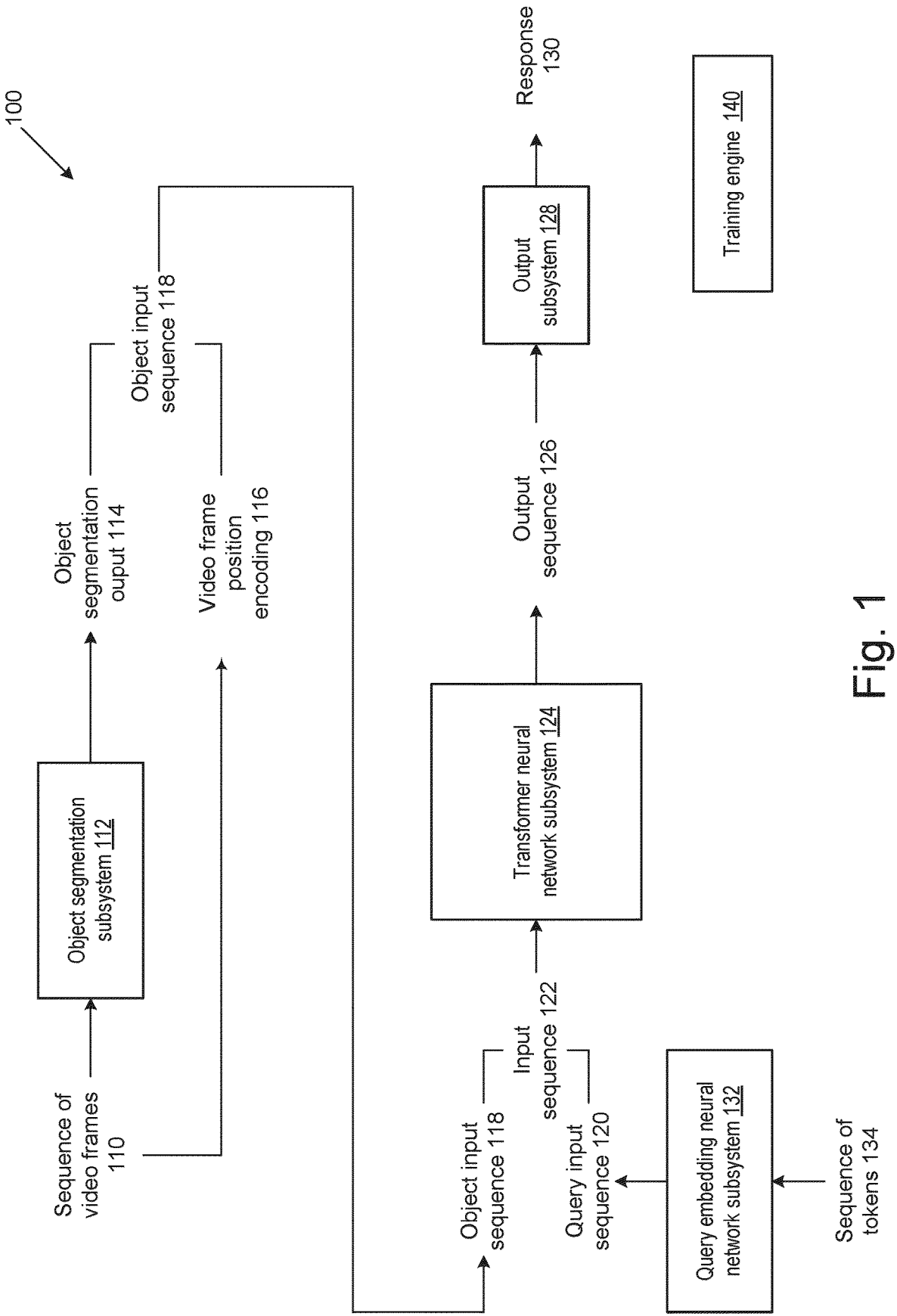
FIG. 1 shows an example video processing system.

FIG. 1 shows an example video processing system 100. The video processing system 100 is an example of a system that comprises one or more computers and one or more storage devices storing instructions that, when executed by the one or more computers, cause the one or more computers to implement the systems, components, and techniques described below.

The video processing system 100 includes an object segmentation subsystem 112 that is configured to receive an input comprising a sequence of video frames 110 and to process pixels of each video frame of the sequence of video frames to generate an object segmentation output 114. For each video frame, the object segmentation output 114 comprises a representation of each object of a plurality of objects in the video frame.

For example, the object segmentation subsystem 112 may receive each video frame as a set of pixel values for the frame and may process the pixel values to generate a set of d-dimensional vectors, each comprising a representation of one of the objects. The representation of each object may be a disentangled representation. As used herein a disentangled representation may be one in which each object is described by a separate set of parameters, i.e. the parameters of one of the objects are not substantially affected by another of the objects. In implementations of the system the disentangled representation need not be fully disentangled.

A video frame position encoding 116 is also generated from the sequence of video frames 110. This encodes the relative position, i.e. time, or order, of each video frame in the sequence. Any suitable encoding may be used. In some implementations the position encoding may also be dependent upon a distance in time between different video frames of the sequence—for example, the position at time t may be encoded as a d-dimensional vector where the value of each dimension i, is $\sin(\omega t)$ for even i and $\cos(\omega t)$ for odd i, where $\omega = N^{-2i/d}$ where N is a large number e.g. 10000.

In implementations the object segmentation output 114 for each video frame is combined with the video frame position encoding 116 to generate an object input sequence 118. For example the representation of each object in a video frame may be concatenated with the position encoding for the frame; or the representation of each object in a video frame may be added to the position encoding for the frame (where these are vectors of the same dimension). Thus the object input sequence 118 comprises a sequence of elements each of which includes a position encoding.

In some implementations the transformer neural network subsystem 124 also receives a query input sequence 120 representing a query to be applied to the sequence of video frames, in particular a query relating to the objects represented in the video frames, as described further below. This provides a flexible system which can be used to interrogate the video in more than one way. In some other implementations the transformer neural network subsystem 124 may be trained to implement a particular, predetermined query (such as predicting the location of an object), and an explicit query input is not needed.

Thus the transformer neural network subsystem 124 receives an input sequence 122 which comprises the object input sequence 118, and which may further comprise the query input sequence 120. The query input sequence 120, where present, may be appended to the object input sequence 118. The transformer neural network subsystem 124 is configured to apply the succession of attention neural network layers to the input sequence 122 to generate an output sequence 126 that comprises a transformed input element for each element of the input sequence 122.

The transformer neural network subsystem 124 is a neural network subsystem that is characterized by having a succession of attention neural network layers, in implementations, self-attention neural network layers. An attention neural network layer has an attention layer input for each element of the input sequence and is configured to apply an attention mechanism over the attention layer input to generate an attention layer output for each element of the input sequence. The attention layer input and the attention layer output comprise vectors of the same dimension, and the attention neural network layers may have residual connections.

In implementations the succession of attention neural network layers comprises different successive layers of the transformer neural network subsystem, each layer applying a different (learned) attention function. However the same attention neural network layer may be applied a succession of times, i.e. the same (learned) attention function may be applied multiple times, optionally a variable number of times. Generally in this specification the term "learned"

refers to a function or value that has been adjusted during the training of the system. In implementations each of the attention neural network layers may receive the position encoding.

In some implementations the attention neural network layers of the transformer neural network subsystem 124 maps n elements of the input sequence 122 to n elements of the output sequence 126. The input sequence is received and processed in parallel by the attention neural network layers to generate the output sequence. For example each attention neural network layer after the first may have an attention layer input which includes a hidden state, and may generate an attention layer output comprising an activation for the hidden state for the next attention neural network layer. The attention layer output of the final attention neural network layer may be used to generate the elements of the output sequence.

In some implementations the transformer neural network subsystem 124 maps n elements of the input sequence 122 to n elements of an intermediate sequence, and the elements of the intermediate sequence are then processed one at a time by an autoregressive decoder to generate the output sequence 126. In general any variant of a transformer neural network may be used in the video processing system 100.

The video processing system 100 includes an output subsystem 128 configured to receive one or more elements of the output sequence 128. The output subsystem 128 processes the one or more elements using one or more output neural network layers to generate a video processing system output that is a response 130 to the query. In some implementations output subsystem 128 just receives a last element of the output sequence 128.

In implementations the video processing system output, i.e. the response 130, defines a probability distribution over a set of possible responses to the query e.g. over a set of possible answers to a question posed by the query. For example the response may comprise a categorical probability distribution over possible output tokens, or a probability that a particular response is true (or false). The video processing system output may comprise a set of scores such as logits or probabilities, one for each possible response of a set of responses, or may otherwise parameterize the probability distribution. In this case the query input sequence 120 may include an encoding of the possible responses.

In some implementations the video processing system output, i.e. the response 130, defines a probability distribution over a set of possible responses that are possible locations of an object, e.g. a categorical distribution over a grid of locations in 1, 2- or 3-dimensions. The object may, but need not be, specified by the query.

The output subsystem 128 may have multiple heads to allow multiple different type of response e.g. depending upon the query.

In implementations the input sequence 122, e.g. the query input sequence 120, includes a summary token element, i.e., a placeholder element that will be used to determine a summary of the input sequence. The output sequence 126 then includes a transformed version of the summary token element, and the output subsystem may receive and process just the transformed summary token element to generate the response 130. In implementations the summary token element is included at the end of the input sequence 122.

The transformed version of the summary token element represents a summary of the input sequence, i.e. because of this arrangement during training it learns to represents a summary of the input sequence. The summary token element may be a learned i.e. trainable, vector e.g. a learned embedding of a summary token. The transformed version of the summary token element may comprise a single vector representing a summary of the input sequence.

As previously described, each element of the object input sequence may comprise a (disentangled) representation of an object in a video frame combined with the position encoding for the frame. The attention layer input of one or more of the attention neural network layers, e.g. of at least the first layer, may include each of the object representations for each of the video frames. This provides a global attention mechanism in which one or more of the attention neural network layers is able to attend to each of the objects in each of the video frames. This can help the system to learn about object dynamics and causal relationships. Where the input sequence 122 includes the query input sequence 120 the attention layer input may also include each element of the query input sequence, so that the global attention mechanism may at the same time attend to the complete query.

In another approach (not shown) a first transformer neural network subsystem processes representations of objects within each frame and a second transformer neural network subsystem hierarchically above the first, performs interframe processing. For example, an input of the first transformer neural network subsystem may be a sequence formed from the representation of each object in a video frame and the elements of the output sequence may be concatenated into a single feature vector. An input of the second transformer neural network subsystem may be a sequence formed from the feature vector for each frame and the output sequence 126 may be the output of the second transformer neural network subsystem. The position encoding for a frame may be included in the input to the first or second transformer neural network subsystem, or both.

It is not necessary to use any particular type of object segmentation subsystem 112. In general, however, the object segmentation subsystem should determine a representation of each of the objects in a frame, i.e. an object feature vector for each of the objects. It is not necessary that the object segmentation subsystem should determine the representation of each of the objects in a consistent order from one frame to the next as the transformer neural network subsystem 124 is able to track object identity across frames.

In some implementations the object segmentation subsystem 112 determines, for each object, a set of parameters parameterizing a multivariate distribution of a latent variable vector representing the object. Components of the latent variable vector may be disentangled and represent a location and/or characteristics of the shape such as a shape, size, and/or color of the object. The object segmentation output 114 may comprise a mean value vector of the distribution for each object, i.e. a vector of mean values of the multivariate distribution, which may be used as a disentangled representation of the object.

Where an object detector is used that generates an object segmentation mask but not a feature vector for each object then an object feature vector may be generated by applying the mask to the image frame and mapping the result to an object feature vector latent space. For example for object i at time t, an object segmentation mask $A_{ti} \in [0,1]^{w \times h}$ for a w×h pixel image may be used to construct an object feature vector $v_{ti} = f(A_{ti} \cdot \text{image})$ where $f$ is a neural network, e.g. a ResNet, applied once for each object.

As mentioned above, the input sequence 122 may be a combination of the object input sequence 118 and the query input sequence 120. The query input sequence 120 may comprise a sequence of vectors representing the query, typically a question about a present or future event or state of the objects.

The query input sequence 120 may be generated by a query embedding neural network subsystem 132 that is configured to receive and process a sequence of tokens 134 representing the query. The query embedding neural network subsystem 132 generates a respective embedding of each token to provide a corresponding vector of the sequence of vectors representing the query. The query embedding neural network subsystem 132 may comprise, for example, one or more feedforward neural network layers, recurrent neural network layers, or attention neural network layers, or a combination of these. Where a response to the query will be a selection from a set of possible responses or answers, the query input sequence 120 may include the possible responses or answers e.g. as embeddings generated by query embedding neural network subsystem 132.

Like the object input sequence 188, each element of the query input sequence 120 may be combined with an encoding of the position of the element in the sequence, to represent an order of the elements, and hence of the tokens. Again any suitable encoding may be used, e.g. as previously described.

In implementations the transformer neural network subsystem 124 is shared between the object input sequence 118 and the query input sequence 120, which facilitates information flow between the tokens representing the query and the representations of the objects. In some implementations, but not necessarily, each element of the input sequence 122 may include a label to indicate whether the element belongs to the object input sequence 118 or to the query input sequence 120. For example the label may be a one-hot vector to identify a modality (object or query) of the element.

The tokens in the sequence of tokens 134 representing the query may comprise words or wordpieces in a natural language, or tokens of a formal language. In implementations the query may, but need not, include a summary token, e.g. a dummy word, that will become the summary token element when processed by the query embedding neural network subsystem 132.

The video processing system 100 may include a training engine 140 to train the system as described later.

The attention mechanism applied by an attention neural network layer may be any sort of attention mechanism. Generally, an attention mechanism maps a query and a set of key-value pairs to an output, where the query, keys, and values are all vectors. The output is computed as a weighted sum of the values, where the weight assigned to each value is computed by a compatibility function e.g. a dot product or scaled dot product, of the query with the corresponding key.

In implementations the attention mechanism is configured to apply a self-attention mechanism over the attention layer input; this may be followed by one or more feed-forward neural network layers to generate the attention layer output. In general an attention mechanism determines a relationship between two sequences; a self-attention mechanism is configured to relate different positions in the same sequence to determine a transformed version of the sequence as an output. For example the attention layer input may comprise a vector for each element of the input sequence. These vectors provide an input to the self-attention mechanism and are used by the self-attention mechanism to determine a new representation of the same sequence for the attention layer output, which similarly comprises a vector for each element of the input sequence. An output of the self-attention mechanism may be used as the attention layer output, or it may be processed by one or more feed-forward layers to provide the attention layer output.

In some implementations the attention mechanism is configured to apply each of a query transformation e.g. defined by a matrix $W^Q$, a key transformation e.g. defined by a matrix $W^K$, and a value transformation e.g. defined by a matrix $W^V$, to the attention layer input for each element of the input sequence X to derive a respective query vector $Q=XW^Q$, key vector $K=XW^K$, and value vector $V=XW^V$, which are used determine an attended sequence for the output. For example the attention mechanism may be a dot product attention mechanism applied by applying each query vector to each key vector to determine respective weights for each value vector, then combining the value vectors using the respective weights to determine the attention layer output for each element of the input sequence. The attention layer output may be scaled by a scaling factor e.g. by the square root of the dimensions of the queries and keys, to implement scaled dot product attention. Thus, for example, an output of the attention mechanism may be determined as softmax $$\mathrm{softmax}\left(\frac{QK^T}{\sqrt{d}}\right)V$$

where d is a dimension of the key (and value) vector. In another implementation the attention mechanism be comprise an "additive attention" mechanism that computes the compatibility function using a feed-forward network with a hidden layer. As previously mentioned, output of the attention mechanism may be further processed by one or more fully-connected, feed forward neural network layers.

The attention mechanism may implement multi-head attention, i.e. it may apply multiple different attention mechanisms in parallel. The outputs of these may then be combined, e.g. concatenated, with a learned linear transformation applied to reduce to the original dimensionality if necessary.

Examples of suitable architectures for the transformer neural network subsystem are described in Ashish Vaswani et al., "Attention is all you need", Advances in Neural Information Processing Systems, pp. 5998-6008, 2017; arXiv:1810.04805 Devlin et al. (BERT); and arXiv: 1901.02860 Dai et al. (Transformer-XL).

Figure 2:
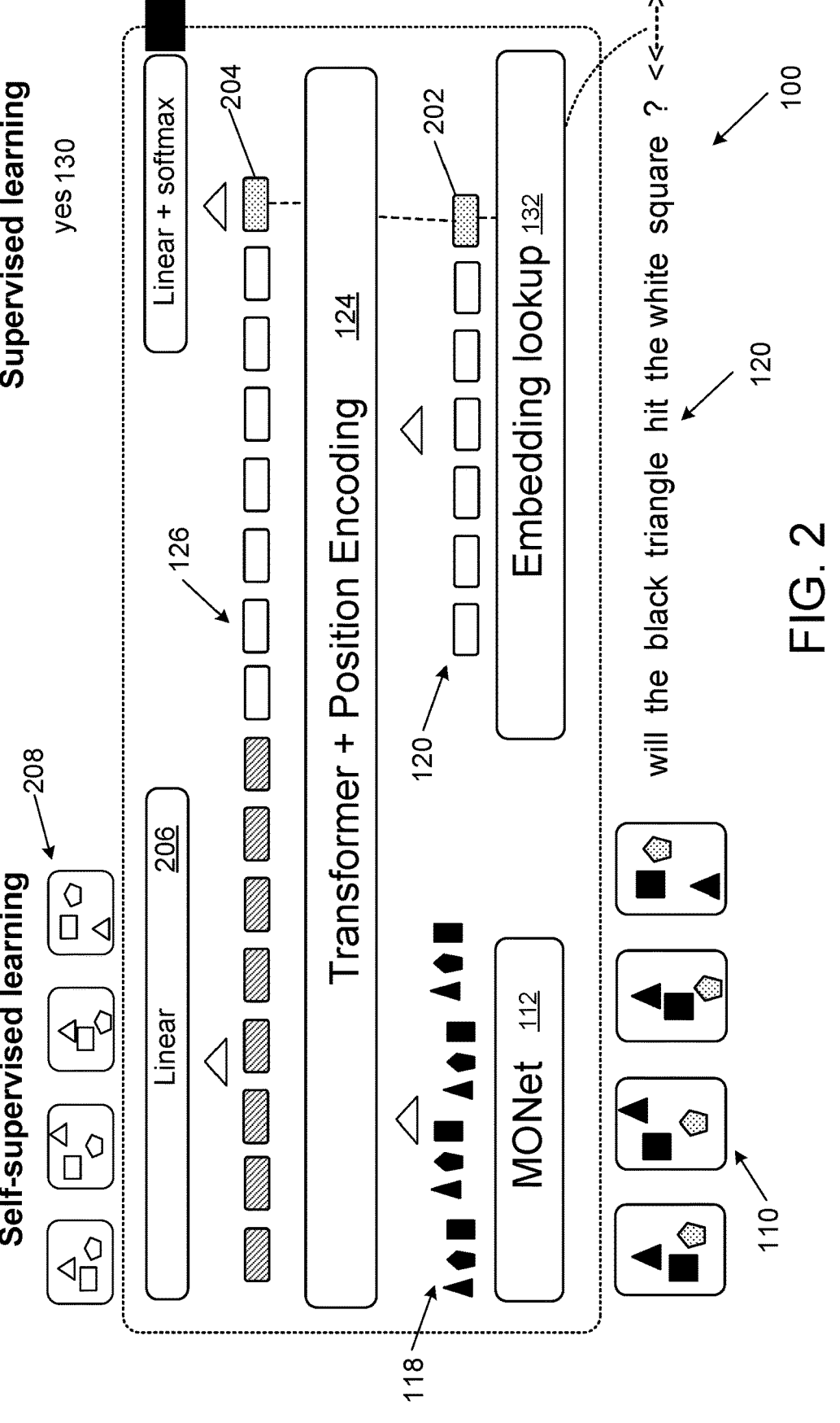
FIG. 2 shows an example architecture of the video processing system.

FIG. 2 shows an example architecture of the video processing system 100; the example also illustrates training of the system.

In the example the sequence of video frames 110 depicts moving objects and the object segmentation subsystem 112 comprises a "MONet" object segmentation subsystem as described in arXiv:1901.11390. In some other example implementations the object segmentation subsystem comprises an "IODINE" object segmentation system as described in arXiv:1903.00450; a Mask R-CNN object segmentation system as described in arXiv:1703.06870; a Faster R-CNN object segmentation system as described in arXiv:1506.01497; or a Detection Transformer (DETR) object segmentation system as described in arXiv: 2005.12872. Some of these have the advantage that they can be trained unsupervised, i.e. without object labels.

As an example, an output of the "MONet" object segmentation subsystem is a set of object attention masks each of which defines, for each image pixel, a probability that the pixel belongs to a corresponding object. The pixels of a mask are encoded into latent variables with d-dimensional means $\mu_{ti}$ where i indexes the object and t indexes the processed video frame. More specifically MONet generates a posterior distribution for latent variables $z_t$, $q(z_t|F_t,A_{ti})$ where $A_{ti}$ is an object segmentation mask as previously described and $F_t$ is a w×h pixel image frame. The posterior distribution q(·) is a diagonal Gaussian and the d-dimensional vector of means $\mu_{ti}$ provides a representation (embedding) of the ith object in the tth image frame, and thus an element of the object input sequence 118. Where multi-headed attention is used a dimension of the latent variables may be linearly projected to a dimension divisible by the number of heads.

The transformer neural network subsystem 124 operates on the object input sequence 118 and on a summary token element 202, in implementations a trainable vector. Where a sequence of tokens representing the query is present the transformer neural network subsystem 124 also operates a query input sequence 120 e.g. a sequence of word embeddings, optionally including embeddings of one or more tokens for each of a set of possible responses to the query.

The transformer neural network subsystem 124 generates the output sequence 126 which includes a transformed summary token element 204 i.e. a transformed version of the summary token element 202. This is passed through the output subsystem 128, e.g. an MLP (multilayer perceptron) with one hidden layer, to generate the response 130. The response 130 may define a categorical distribution over possible responses e.g. "yes", "no", and "undetermined", or over more complex descriptive responses; or may define an object and/or the location of an object.

During training the video processing system 100 may be augmented with a prediction neural network 206. The prediction neural network 206 allows the system to implement self-supervised learning by predicting objects, more specifically object representations, i.e. object embeddings, masked from the input of the transformer neural network subsystem 124. In implementations prediction neural network 206 comprises one or more linear layers.

The prediction neural network 206 may be configured to receive and process, for each video frame, elements of the output sequence 126 from the transformer neural network subsystem 124. More specifically, for each object of the plurality of objects in a video frame the prediction neural network may receive and process a transformed version of an element of the input sequence corresponding to a (disentangled) representation of the object, and generate a corresponding predicted (disentangled) representation 208. However the object representations for some of the objects are masked, thus requiring the transformer neural network subsystem 124 to learn to predict the dynamics of the represented objects. Training the video processing system 100 using the prediction neural network 206 is described further below.

In one particular example implementation 8 objects were represented per frame, each as a vector with 16-dimensions, and a transformer neural network subsystem 124 with 10 heads and 28 attention neural network layers was used. However the best hyperparameter values will in general depend on the application.

Figure 3:
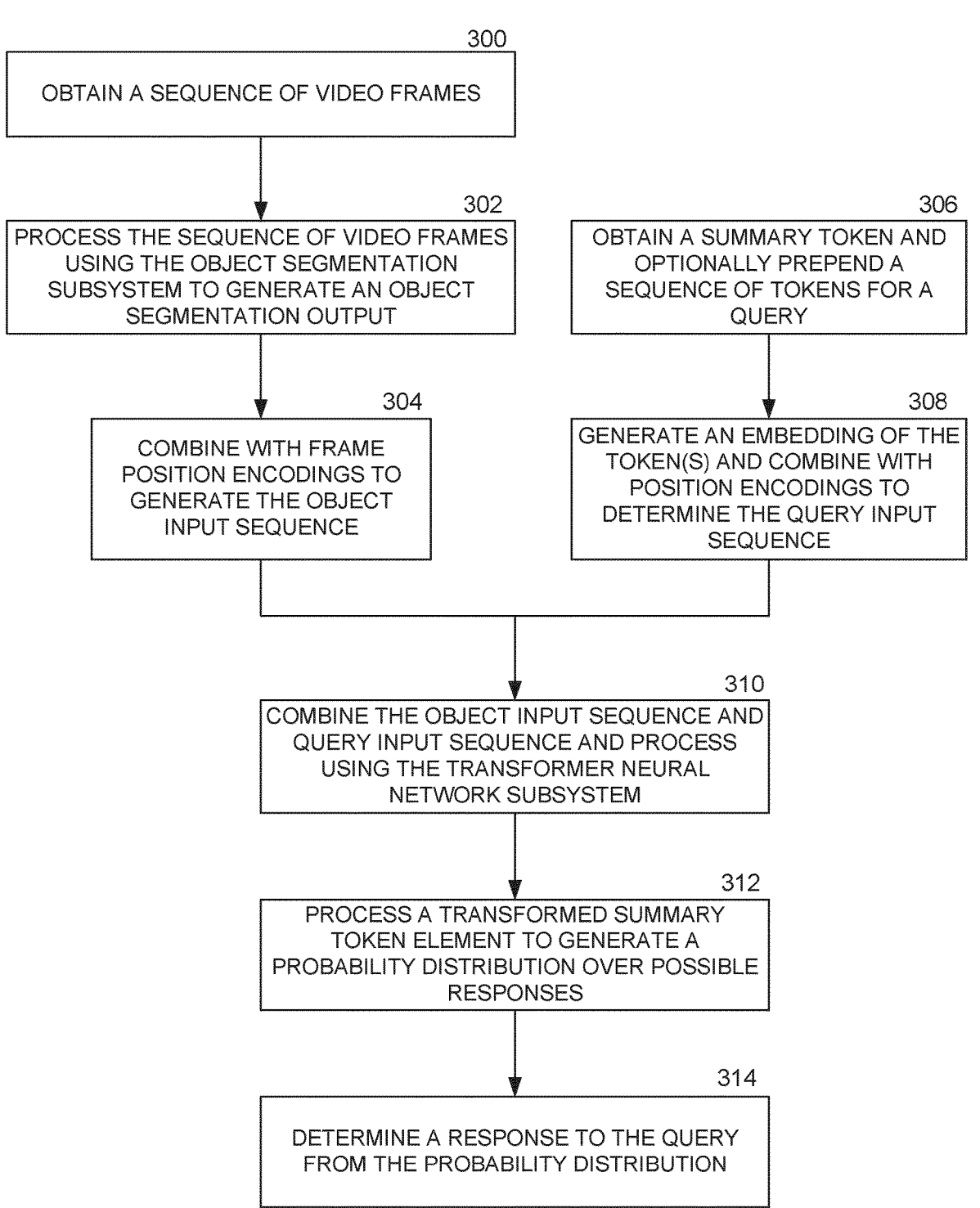
FIG. 3 is a flow diagram of an example process for processing video using the video processing system of FIG. 1.

FIG. 3 shows a flow diagram of an example process for processing video using the video processing system 100 to generate a response to a query.

The process obtains a sequence of video frames (300), and processes this using the object segmentation subsystem 112 to generate the object segmentation output 114 (302). The object segmentation output is combined with frame position encodings to generate the object input sequence 118 (304).

The process also obtains a summary token and optionally prepends a sequence of tokens representing the query (306). The process generates an embedding of the sequence of token(s) using query embedding neural network subsystem 132 and, where the sequence has more than one token, adds position encodings for the tokens (308), to generate the query input sequence 120. In a variant a summary token element for the query input sequence 120 is obtained without using the query embedding neural network subsystem 132.

The object input sequence 118 and the query input sequence 120 are combined to obtain input sequence 122, and this is processed by transformer neural network subsystem 124 to obtain output sequence 126 which includes transformed summary token element 204 (310). The transformed summary token element 204 is then processed by the output subsystem 128 to generate a probability distribution over a set of possible responses to the query (312), and a response to the query is determined from the probability distribution (314). For example the response to the query may be determined as that with a maximum probability; or the response may be sampled from the probability distribution.

Figure 4:
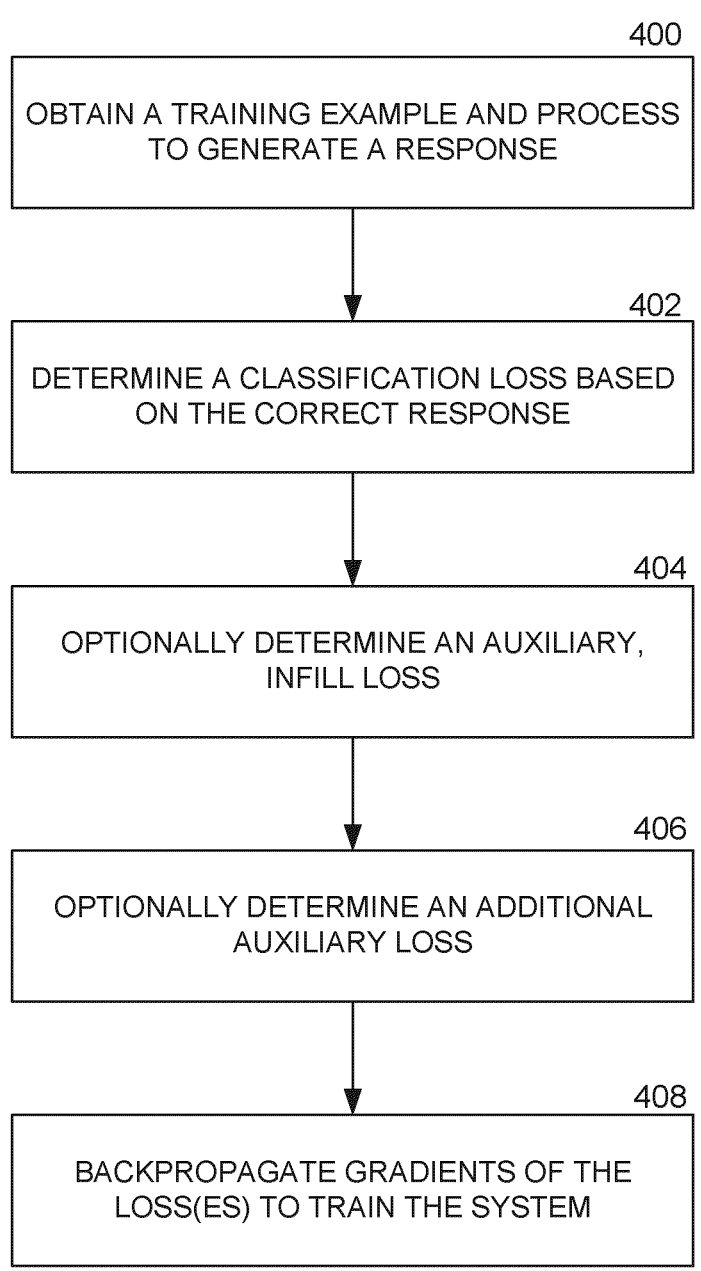
FIG. 4 is a flow diagram of an example process for training the video processing system of FIG. 1.

FIG. 4 shows a flow diagram of an example process for training the video processing system 100. The training process may be implemented by training engine 140.

The process uses training examples each comprising a sequence of video frames, optionally a query where the query is defined by the sequence of tokens 134 input to the system, and a correct response to the query. For each training example the sequence of video frames, and optional query, is processed as described above (400) to generate a response 130.

In general the system, in particular the transformer neural network subsystem, is trained using conventional supervised machine learning techniques, e.g., based on backpropagation, to optimize an objective function that is dependent upon a difference between the video processing system output and a correct response to the query for the training example, i.e. dependent on whether the video processing system output is correct. In implementations the object segmentation subsystem is pre-trained.

In implementations a classification loss is determined (402) dependent on a different between the response 130 generated by processing the sequence of video frames from the training example, and the correct response. The classification loss may be, e.g. a squared (L2) loss or a cross-entropy loss. The process trains the output subsystem 128, the transformer neural network subsystem 124, and (with a query input) the query embedding neural network subsystem 132 by backpropagating gradients of the classification loss (408). Gradient propagation may be stopped at the object segmentation subsystem 112. The training may use a LAMB optimizer (arXiv:1904.00962).

Some implementations of the training method also determine an auxiliary, infill loss (404) using the prediction neural network 206. The training method may then include suppressing the representation of one or more the objects for one or more of the video frames in the object segmentation output, e.g. by masking out one or more object representations. The method then determines an infill loss dependent upon a measure of difference between the suppressed representation and the predicted representation, backpropagating gradients of the infill loss to adjust parameters, e.g. weights, of the transformer neural network subsystem 124.

This enables further, self-supervised training that may be performed using training examples which do not include correct responses. In implementations, during training with the infill loss, gradients are propagated through the prediction neural network 206 and the transformer neural network subsystem 124, and these are trained, but the query embedding neural network subsystem is not trained.

In a particular example, the ith object in the tth image frame is represented by a vector of means $\mu_{ti}$. A mask $m_{ti} \in \{0,1\}$ is applied to obtain a masked representation of objects in the video frames $m_{ti}\mu_{ti}$, transformed to $\mu'_{ti}$ by the transformer neural network subsystem 124. The transformer neural network subsystem 124 is then trained so that the masked out object representation can be predicted from $\mu'_{ti}$, using an auxiliary, infill loss determined from:

$$\sum_{t,i} \tau_{ti} l(f(\mu'_{ti}), \mu)$$

where $l(\cdot)$ is a loss function, $f(\cdot)$ is the (learned) linear mapping applied by the prediction neural network 206, and $\tau_{ti} \in \{0,1\}$ are one-hot indicator variables identifying the prediction targets, e.g. $\tau_{ti}=1-m_{ti}$ (though not necessarily just identifying the masked-out entries as the prediction targets may be a subset of these). The loss function $l(\cdot)$ may be e.g. an L2 loss $(f(\mu't_i)-\mu_{ti})^2$ or a form of contrastive loss e.g.

$$-\log \frac{\exp(f(\mu'_{ti}) \cdot \mu_{ti})}{\sum_{s,j} \exp(f(\mu'_{ti}) \cdot \mu_{sj})}$$

or a valiant thereof, where s runs over the video frames.

Various masking schemes may be used, e.g. setting $m_{ti}=1$ uniformly at random over t and i; constraining such masking so that exactly one object representation is masked per frame; adding a buffer of one or more frames between the context, where $m_{ti}=1$, and the infilling target(s) where $\tau_{ti}=1$, where $m_{ti}=0$ and $\tau_{ti}=0$ in the buffer zone. The total loss may be a combination of the classification loss and the auxiliary, infill loss weighted by a parameter $\lambda$. Both losses may be minimized during the same training process i.e. without a pre-training step.

Where the response defines the location of an object the method of training may include determining an additional auxiliary loss (406) dependent upon a measure of a distance between the response to the query and a correct response to the query e.g. dependent on distance between a predicted and actual location of the object. The total loss may include a weighted contribution from the additional auxiliary loss.

The distance may be a physical distance or a measure of similarity. For example the additional auxiliary loss may be an L1 distance between a predicted grid location or "cell" and an actual grid location or cell. The training method may then include backpropagating gradients of the additional auxiliary loss to adjust parameters of the transformer neural network subsystem 124. This can assist object tracking where a camera capturing the video frames is moving.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, specialpurpose hardware accelerator units for processing common and compute-intensive parts of machine learning training or production, i.e., inference, workloads.

Machine learning models can be implemented and deployed using a machine learning framework, e.g., a TensorFlow framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A video processing system comprising one or more computers and one or more storage devices storing instructions that, when executed by the one or more computers, cause the one or more computers to implement:

an object segmentation subsystem that is configured to receive an input comprising a sequence of video frames and to process each video frame of the sequence of video frames to generate an object segmentation output wherein, for each video frame, the object segmentation output comprises a representation of each object of a plurality of objects in the video frame;

a transformer neural network subsystem that is configured to receive an input sequence comprising i) an object input sequence including the object segmentation output for each video frame combined with an encoding of a position of the video frame in the sequence of video frames and ii) a query input sequence comprising a sequence of vectors representing a query, and to process the input sequence in parallel for all video frames in the sequence of video frames by applying a succession of attention neural network layers to generate an output sequence comprising a transformed input element for each element of the input sequence, wherein one or more of the attention neural network layers has an attention layer input for each element of the input sequence, the elements of the input sequence comprising a respective element for each representation of each of the plurality of objects of each of the video frames and for each of the sequence of vectors representing the query, and is configured to attend over representations of each of the plurality of objects in each of the video frames and each of the sequence of vectors representing the query by applying an attention mechanism over the attention layer inputs for the elements of the input sequence that include a respective element for each of the representations for each of the video frames and for each of the sequence of vectors representing the query to generate an attention layer output for each element of the input sequence; and an output subsystem that is configured to receive one or more elements of the transformed input sequence and to process the one or more elements of the transformed input sequence by applying one or more output neural network layers to generate a video processing system output, wherein the video processing system output represents a response to the query on the objects in the sequence of video frames.

2. The video processing system of claim 1 wherein the input sequence further comprises a summary token element, wherein the output sequence comprises a transformed summary token element representing a summary of the input sequence, and wherein the output subsystem is configured to receive the transformed summary token element and to process the transformed summary token element to generate the video processing system output.

3. The video processing system of claim 1 wherein the object input sequence comprises a sequence of elements for each video frame, each comprising one of the representations combined with the encoding of the position of the video frame.

4. The video processing system of claim 1 wherein the object segmentation subsystem is configured to determine, for each of the objects, a set of parameters parameterizing a distribution of a latent variable vector representing the object, and the object segmentation output comprises a mean value vector of the distribution for each object, where the mean value vector is the representation of the object.

5. The video processing system of claim 1 further comprising a query embedding neural network subsystem that is configured to receive a sequence of tokens representing the query and to process the sequence of tokens to generate the sequence of vectors representing the query, wherein the vectors representing the query comprise embeddings of the tokens.

6. The video processing system of claim 5 wherein the tokens comprise words or wordpieces in a natural language.

7. The video processing system of claim 1 wherein elements of the input sequence each include a label to identify whether the element belongs to the object input sequence or to the query input sequence.

8. The video processing system of claim 1, wherein the input sequence further comprises a summary token element, wherein the output sequence comprises a transformed summary token element representing a summary of the input sequence, and wherein the output subsystem is configured to receive the transformed summary token element and to process the transformed summary token element to generate the video processing system output, and wherein the summary token element belongs to the query input sequence.

9. The video processing system of claim 1 wherein one or more of the attention neural network layers is configured to apply a self-attention mechanism over the attention layer input, followed by a feed-forward neural network layer to generate the attention layer output.

10. The video processing system of claim 1 wherein the attention mechanism is configured to apply each of a query transformation, a key transformation, and a value transformation to the attention layer input for each element of the input sequence to derive a respective query vector, key vector, and value vector; to apply each query vector to each key vector to determine respective weights for each value vector, and combining the value vectors using the respective weights to determine the attention layer output for each element of the input sequence.

11. The video processing system of claim 1, wherein the video processing system output defines a probability distribution over a set of possible responses to the query.

12. The video processing system of claim 1, wherein the video processing system further comprises a prediction neural network that is configured to receive and process, for each video frame, the transformed input elements for the representations of each object of the plurality of objects in the video frame, and to generate from the transformed input elements a predicted representation for the representation of each object in each video frame, and wherein the video processing system has been trained by performing operations comprising: suppressing, in the object segmentation output, the representation of one or more the objects for one or more of the video frames; determining an infill loss dependent upon a measure of difference between the suppressed representation and the predicted representation, and backpropagating gradients of the infill loss to adjust parameters of the transformer neural network subsystem.

13. The video processing system of claim 1, wherein the video processing system has been trained by performing operations comprising: determining an auxiliary loss dependent upon a measure of a distance between the response to the query and a correct response to the query, and backpropagating gradients of the auxiliary loss to adjust parameters of the transformer neural network subsystem.

14. One or more non-transitory computer-readable storage media storing instructions that when executed by one or more computers cause the one or more computers to implement:

an object segmentation subsystem that is configured to receive an input comprising a sequence of video frames and to process each video frame of the sequence of video frames to generate an object segmentation output wherein, for each video frame, the object segmentation output comprises a representation of each object of a plurality of objects in the video frame;

a transformer neural network subsystem that is configured to receive an input sequence comprising i) an object input sequence including the object segmentation output for each video frame combined with an encoding of a position of the video frame in the sequence of video frames and ii) a query input sequence comprising a sequence of vectors representing a query, and to process the input sequence in parallel for all video frames in the sequence of video frames by applying a succession of attention neural network layers to generate an output sequence comprising a transformed input element for each element of the input sequence, wherein one or more of the attention neural network layers has an attention layer input for each element of the input sequence, the elements of the input sequence comprising a respective element for each representation of each of the plurality of objects of each of the video frames and for each of the sequence of vectors representing the query, and is configured to attend over representations of each of the plurality of objects in each of the video frames and each of the sequence of vectors representing the query by applying an attention mechanism over the attention layer inputs for the elements of the input sequence that include a respective element for each of the representations for each of the video frames and for each of the sequence of vectors representing the query to generate an attention layer output for each element of the input sequence; and an output subsystem that is configured to receive one or more elements of the transformed input sequence and to process the one or more elements of the transformed input sequence by applying one or more output neural network layers to generate a video processing system output, wherein the video processing system output represents a response to the query on the objects in the sequence of video frames.

15. A method performed by one or more computers, the method comprising:

receiving an input comprising a sequence of video frames; and processing the input comprising the sequence of video frames using a video processing system to generate a video processing system output, wherein the video processing system comprises:

an object segmentation subsystem that is configured to receive the input comprising the sequence of video frames and to process each video frame of the sequence of video frames to generate an object segmentation output wherein, for each video frame, the object segmentation output comprises a representation of each object of a plurality of objects in the video frame;

a transformer neural network subsystem that is configured to receive an input sequence comprising i) an object input sequence including the object segmentation output for each video frame combined with an encoding of a position of the video frame in the sequence of video frames and ii) a query input sequence comprising a sequence of vectors representing a query, and to process the input sequence in parallel for all video frames in the sequence of video frames by applying a succession of attention neural network layers to generate an output sequence comprising a transformed input element for each element of the input sequence, wherein one or more of the attention neural network layers has an attention layer input for each element of the input sequence, the elements of the input sequence comprising a respective element for each representation of each of the plurality of objects of each of the video frames and for each of the sequence of vectors representing the query, and is configured to attend over representations of each of the plurality of objects in each of the video frames and each of the sequence of vectors representing the query by applying an attention mechanism over the attention layer inputs for the elements of the input sequence that include a respective element for each of the representations for each of the video frames and for each of the sequence of vectors representing the query to generate an attention layer output for each element of the input sequence; and an output subsystem that is configured to receive one or more elements of the transformed input sequence and to process the one or more elements of the transformed input sequence by applying one or more output neural network layers to generate a video processing system output, wherein the video processing system output represents a response to the query on the objects in the sequence of video frames.

16. The method of claim 15 wherein the input sequence further comprises a summary token element, wherein the output sequence comprises a transformed summary token element representing a summary of the input sequence, and wherein the output subsystem is configured to receive the transformed summary token element and to process the transformed summary token element to generate the video processing system output.

17. The method of claim 15 wherein the object input sequence comprises a sequence of elements for each video frame, each comprising one of the representations combined with the encoding of the position of the video frame.

18. The method of claim 15 wherein the object segmentation subsystem is configured to determine, for each of the objects, a set of parameters parameterizing a distribution of a latent variable vector representing the object, and the object segmentation output comprises a mean value vector of the distribution for each object, where the mean value vector is the representation of the object.

19. The video processing system of claim 1 wherein the query comprises a request for a prediction of a future event or state relating to one or more of the objects in the sequence of video frames.

20. The method of claim 15 further comprising a query embedding neural network subsystem that is configured to receive a sequence of tokens representing the query and to process the sequence of tokens to generate the sequence of vectors representing the query, wherein the vectors representing the query comprise embeddings of the tokens.

* * * * *